April 29, 1930.  F. S. CARR  1,756,631
NUT FASTENING INSTALLATION
Filed Jan. 20, 1927
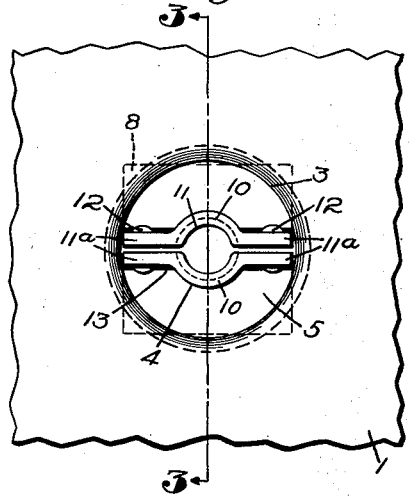
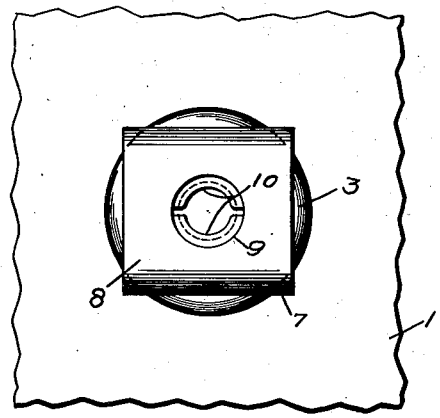
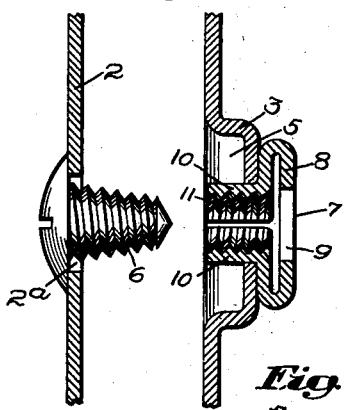
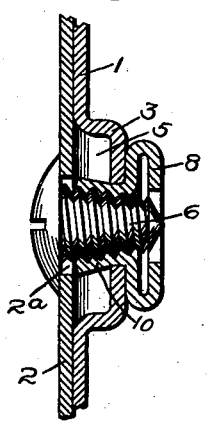
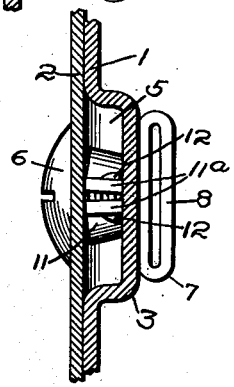
Inventor:
Fred S. Carr
by Emery Booth Janney & Varney,
Atty's Patented Apr. 29, 1930

1,756,631

UNITED STATES PATENT OFFICE

FRED S. CARR, OF NEWTON, MASSACHUSETTS, ASSIGNOR, BY MESNE ASSIGNMENTS, TO UNITED-CARR FASTENER CORPORATION, OF CAMBRIDGE, MASSACHUSETTS, A CORPORATION OF MASSACHUSETTS

NUT-FASTENING INSTALLATION

Application filed January 20, 1927. Serial No. 162,279.

This invention aims to provide an improved nut fastening installation.

In the drawings, which illustrate a preferred embodiment of my invention:—

Figure 1 is a front elevation of a portion of a support with a nut part attached thereto;

Fig. 2 is a rear view of the parts shown in Fig. 1;

Fig. 3 includes a section on the line 3—3 of Fig. 1, and also an elevation of a screw and cross-section of a part to be attached by the screw before the parts are secured together;

Fig. 4 is a section showing the parts shown in Fig. 3 after they have been secured together; and Fig. 5 is a section of the installation showing the fastener parts in elevation.

Referring to the drawings, I have illustrated nut and screw fastening means in connection with securing two pieces of sheet metal together, but it should be understood that the same fastening means may be used particularly, though not exclusively, for securing hinges, locks and other parts to the metal body or other portions of a vehicle.

The metal parts shown in the drawings may be termed the body portion or support 1 and a part 2 to be secured to the support. In this instance, I have provided the support 1 with a depressed portion 3 having a notched aperture 4 formed in the bottom thereof, and providing a recess 5 for purposes more fully hereinafter described. The part 2 is merely provided with a plain aperture $2^a$ therethrough, as shown in Figs. 3 and 4.

The fastener parts include a screw 6, which in this instance is preferably tapered, and a nut 7. The nut 7 may be formed in any suitable manner, but I prefer to press it from sheet metal to provide a base 8 having an aperture 9 therethrough, inwardly folded portions 10 being bent toward each other from the periphery of the base. A central tubular split portion 11 extends outwardly from the inwardly folded portions and is internally threaded to receive the screw 6. At the sides of the tubular portion, I provide parallel wing portions $11^a$ having interlocking generally tapered projections 12 pressed therefrom.

In assembling the nut 7 with the support, the tubular portion 11 and wing portions $11^a$ are entered through the notched aperture 4, from the rear face of the support, so that the base 8 may contact with the depressed portion and prevent the nut from passing entirely through the aperture 4, as shown in Fig. 3. It should be noticed that the tubular portion 11 and wing portions $11^a$ project into the recess 5, but not beyond the outer face of the support 1. When placing the nut in the aperture 4, the projections 12 contact with the walls of the notches 13 so that considerable pressure must be exerted to squeeze the wing portions together and permit the projections to snap through the notched portions 13 of the aperture 4. As the edges of the projections 12 which face the base 8 are abrupt, they will contact with the outer surface of the depressed portion 3 and prevent the nut from being accidentally disassembled from the support. The space between the inwardly bent portions 10 and the projections 12 is preferably great enough to accommodate the nut to varying thicknesses of the support to which the nut may be secured.

In securing the part 2 in place, the tapered screw 6 is entered in the aperture $2^a$ and threaded into engagement with the threads of the split tubular portion 11, as shown in Fig. 4. Thus the part 2 is clamped tightly against the outer surface of the support 1 and the tubular portion 11 is expanded to tightly draw the inwardly folded portion 10, which for all practical purposes may be termed as part of the base, against the inner face of the support. In expanding the tubular portion 11, it is forced tightly against the wall of the aperture (Fig. 4) and at the same time sets up a resistance against the screw, to such an extent that the threads of the screw are gripped tightly by the threads of the tubular portion and the screw cannot rattle loose when the assembly is subjected to constant vibration.

The projections 12 also provide means for preventing the screw from moving the nut out of its proper relationship with its support 1 when the screw is being threaded into engagement with the threads of the nut.

While I have shown and described a preferred embodiment of my invention, it should be understood that changes involving omission, substitution, alteration and reversal of parts and even changes in the mode of operation may be made without departing from the scope of my invention.

Claims:

1. A fastener installation comprising, in combination, a support having an aperture formed therein, a nut having a base portion seated against one face of the support and an internally threaded portion extending from said base portion through said aperture, said internally threaded portion having a wing portion also passing through the support, said wing portion cooperating with a portion of the support to prevent turning of the nut relative to the support and a lateral projection extending from one of said portions and engaging the other face of the support, said base portion and said lateral projection thereby normally holding the nut against accidental removal from support prior to threading a screw into the internally threaded portion of the nut.

2. A fastening installation comprising, in combination, a support having an aperture formed therein, a nut having a base portion and a contractible and expansible portion, the contractible and expansible portion passing through said aperture and presenting wing portions also passing through the aperture in the support to prevent turning movement between the nut and support, laterally projecting portions extending from said wing portions to engage the opposite side of the support from that side which the base portion engages thereby retaining the nut with the support before the resilient portion is expanded, and means for engagement with said nut to expand said resilient portion to lock said nut in engagement with said support.

3. A fastening installation comprising, in combination, a support having a depression formed therein, the depressed portion having an aperture formed therein, a pressed metal one-piece nut having a screw receiving contractible and expansible portion passed through said aperture from the rear face of said support, said depressed portion providing a recess into which said screw receiving portion projects without projecting beyond the outer surface of said support, wing portions extending from the sides of the screw receiving portion for interlocking engagement with said support against relative rotation, and projecting portions presented by said screw-receiving portion and snapped through said aperture for preventing a screw from accidentally forcing the nut out of engagement with the support when securing a part against the outer face of the support.

4. A screw threaded nut pressed from sheet metal and provided with a base, inwardly bent portions having their inner ends formed to provide a tubular threaded resilient portion, wing means located at the sides of said tubular portion for holding said nut against rotation when secured to a support and laterally projecting means provided integral with said wing means for cooperating with said base to hold the nut in assembly with the nut-carrying support.

In testimony whereof, I have signed my name to this specification.

FRED S. CARR.